United States Patent
Yoshizue (10) Patent No.: US 11,708,885 B2
(45) Date of Patent: Jul. 25, 2023

(54) DRIVE DEVICE

(71) Applicant: Toyota Jidosha Kabushiki Kaisha, Toyota (JP)

(72) Inventor: Kensuke Yoshizue, Toyota (JP)

(73) Assignee: TOYOTA JIDOSHA KABUSHIKI KAISHA, Toyota Aichi-ken (JP)

(*) Notice: Subject to any disclaimer, the term of this patent is extended or adjusted under 35 U.S.C. 154(b) by 171 days.

(21) Appl. No.: 17/227,692

(22) Filed: Apr. 12, 2021

(65) Prior Publication Data

US 2021/0324951 A1 Oct. 21, 2021

(30) Foreign Application Priority Data

Apr. 16, 2020 (JP) .................................. 2020-073716

(51) Int. Cl.
  *F16H 55/17* (2006.01)
  *F16H 55/08* (2006.01)

(52) U.S. Cl.
  CPC ............. *F16H 55/17* (2013.01); *F16H 55/08* (2013.01); *F16H 2055/0866* (2013.01)

(58) Field of Classification Search
  CPC .. F16H 55/17; F16H 55/08; F16H 2055/0866; F16H 55/02; F16H 55/171; F16H 7/023
  See application file for complete search history.

(56) References Cited

U.S. PATENT DOCUMENTS

2013/0118282 A1* 5/2013 Potts .................. F16H 1/003
                                                                    29/893.3

FOREIGN PATENT DOCUMENTS

| JP | 2016-130572 A | 7/2016 | |
| WO | WO-2013084838 A1 * | 6/2013 | ............... F16H 1/16 |
| WO | 2014/168032 A1 | 10/2014 | |

* cited by examiner

*Primary Examiner* — Zakaria Elahmadi
(74) *Attorney, Agent, or Firm* — Dinsmore & Shohl LLP (57) ABSTRACT

A drive device includes: a motor; and a power transmission device that transmits power of the motor to a wheel. Further, in the power transmission device has a meshing portion in which a meshing tooth that is formed on an input-side rotation member and a meshing tooth that is formed on an output-side rotation member mesh with each other on a power transmission path between the motor and the wheel, the meshing tooth has a driving-side teeth surface that makes contact for transmission of power from the motor to the wheel and a non-driving-side teeth surface that makes contact for transmission of power from the wheel to the motor, and in the meshing tooth, a tooth root of the driving-side teeth surface has a higher breaking strength than a tooth root of the non-driving-side teeth surface.

9 Claims, 7 Drawing Sheets

DRIVE DEVICE

CROSS-REFERENCE TO RELATED APPLICATION(S)

The present application claims priority to and incorporates by reference the entire contents of Japanese Patent Application No. 2020-073716 filed in Japan on Apr. 16, 2020.

BACKGROUND

The present disclosure relates to a drive device.

Japanese Laid-open Patent Publication No. 2016-130572 discloses a torque fuse member that is provided on a power transmission path between a wheel and a speed reducer to prevent the wheel from locking up when there is trouble in the rotation of a motor or the speed reducer while the vehicle to which an in-wheel motor drive device is mounted is running. The torque fuse member is broken by an excessive torque reversely input from the wheel side. In a configuration described in Japanese Laid-open Patent Publication No. 2016-130572, the wheel is separated from the speed reducer by breaking the torque fuse member, and thereby the wheel becomes rotatable relative to the motor and the speed reducer.

SUMMARY

There is a need for providing a drive device that is configured to prevent locking of a wheel while ensuring breaking strength required for driving the wheel.

According to an embodiment, a drive device includes: a motor; and a power transmission device that transmits power of the motor to a wheel. Further, in the power transmission device has a meshing portion in which a meshing tooth that is formed on an input-side rotation member and a meshing tooth that is formed on an output-side rotation member mesh with each other on a power transmission path between the motor and the wheel, the meshing tooth has a driving-side teeth surface that makes contact for transmission of power from the motor to the wheel and a non-driving-side teeth surface that makes contact for transmission of power from the wheel to the motor, and in the meshing tooth, a tooth root of the driving-side teeth surface has a higher breaking strength than a tooth root of the non-driving-side teeth surface.

DETAILED DESCRIPTION

In the related art, in some cases, drive devices mounted to vehicles powered by motors generate torque exceeding torque that is applied upon locking the wheels, while the vehicles are running, even when there is no trouble in the rotation of the motors or speed reducers. For example, if a brake pedal is suddenly depressed by a driver (during sudden braking) while a vehicle is running, a torque larger than that generated upon locking a wheel is generated.

The configuration described in Japanese Laid-open Patent Publication No. 2016-130572 can prevent the locking of the wheel by breakage of the torque fuse member, but excessive torque generated in sudden braking of the vehicle is not taken into consideration. In other words, the configuration described in Japanese Laid-open Patent Publication No. 2016-130572, may cause breakage of the torque fuse member by a torque generated upon suddenly braking the vehicle. This results into disabled driving of the wheel, even if the driver tries to accelerate the vehicle again after sudden braking. Therefore, it is desired to provide a torque fuse member that prevents locking of the wheel while ensuring breaking strength to withstand excessive torque generated upon sudden braking.

Hereinafter, a drive device according to embodiments of the present disclosure will be specifically described with reference to the drawings. Note that the present disclosure is not limited to the embodiments described below.

Figure 1:
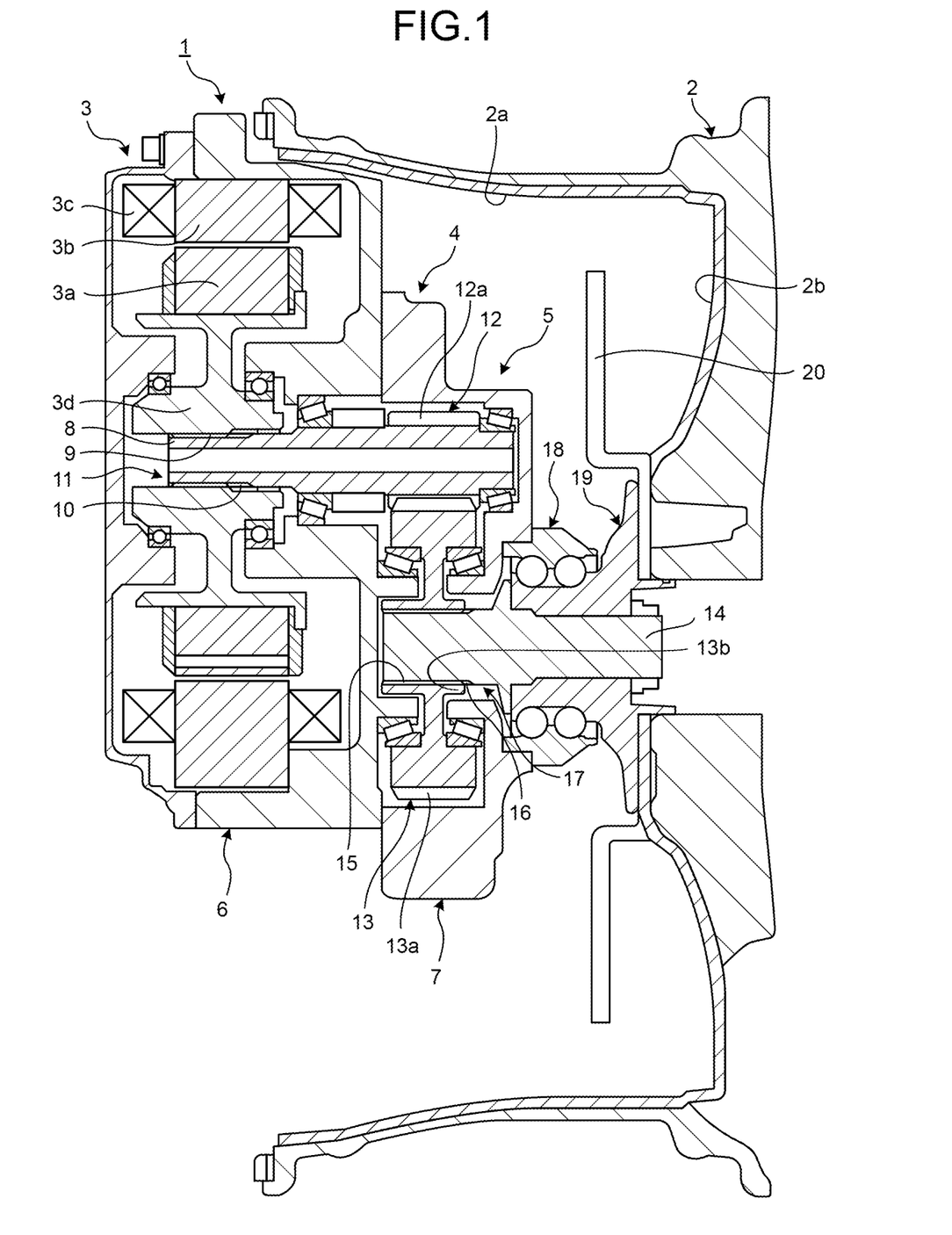
FIG. 1 is a cross-sectional view schematically illustrating a drive device according to an embodiment.

FIG. 1 is a cross-sectional view schematically illustrating the drive device according to an embodiment. In the embodiment, a drive device that is mounted to a vehicle powered by an in-wheel motor will be described.

As illustrated in FIG. 1, an in-wheel motor drive device 1 includes a motor 3 that drives a wheel 2 and a power transmission device 4 that transmits the power of the motor 3 to the wheel 2. The power transmission device 4 includes a speed reducer 5 that reduces the speed of rotation of the motor 3 and outputs the rotation of the motor 3. In the in-wheel motor drive device 1, power output from the motor 3 is transmitted to the wheel 2 via the speed reducer 5.

Furthermore, the in-wheel motor drive device 1 includes a motor case 6 that houses the motor 3 and a speed reducer case 7 that houses the speed reducer 5. As illustrated in FIG. 1, the in-wheel motor drive device 1 is arranged inside a rim 2a of the wheel 2. Note that the in-wheel motor drive device 1 is connected to a lower arm and is supported by the body of the vehicle via a suspension (neither is illustrated).

The motor 3 has a rotor 3a and a stator 3b. The rotor 3a and the stator 3b are arranged inside the motor case 6. The rotor 3a is connected to a first rotation shaft 8 so as to rotate together with the first rotation shaft 8. The first rotation shaft 8 is a rotation shaft that functions as an output shaft of the motor 3. The stator 3b is fixed to an inner wall of the motor case 6. The stator 3b includes a stator core and a stator coil 3c that is wound around the stator core. The motor 3 is a three-phase motor, is electrically connected to a power supply device provided at the body of the vehicle, and generates torque by power supplied from the power supply device. Furthermore, the motor 3 functions as a generator that generates power by rotation of the rotor 3a by the power (torque) of the wheel 2 to generate power and supplies the generated power, as regenerative power, to the power supply device.

As illustrated in FIG. 1, the rotor 3a is connected to the first rotation shaft 8 via a rotor shaft 3d so as to rotate together with the first rotation shaft 8. The rotor 3a is fixed to the rotor shaft 3d. The rotor 3a is rotated together with the rotor shaft 3d. The rotor shaft 3d is rotatably supported to the motor case 6 via a bearing. The rotor shaft 3d is a hollow shaft and has an inner peripheral portion being in spline engagement with the first rotation shaft 8.

Internal spline teeth 9 are formed on the inner peripheral portion of the rotor shaft 3d. External spline teeth 10 are formed on the outer peripheral portion of the first rotation shaft 8. A spline engagement portion 11 is formed in which the rotor shaft 3d is in spline engagement with the first rotation shaft 8. The spline engagement portion 11 is a meshing portion in which meshing teeth mesh with each other on a power transmission path between the motor 3 and the wheel 2, and in the meshing portion, the internal spline teeth 9 and the external spline teeth 10 mesh with each other. In the spline engagement portion 11, the rotor shaft 3d that is a rotation element on the motor side is an input-side rotation member, and the first rotation shaft 8 that is a rotation element on the wheel side is an output-side rotation member.

Furthermore, the motor 3 is connected to the speed reducer 5 via the first rotation shaft 8. The first rotation shaft 8 extends to protrude from the inside of the motor case 6, and the protruding portion is housed inside the speed reducer case 7. The first rotation shaft 8 is rotatably supported to the motor case 6 and the speed reducer case 7 via a bearing.

The speed reducer 5 has a parallel shaft gear mechanism, and includes a driving gear 12 that has a small-diameter and rotates together with the first rotation shaft 8, and a driven gear 13 that has a large-diameter and meshes with the driving gear 12. The driving gear 12 is a gear that is arranged coaxially with the first rotation shaft 8 and outputs the power of the motor 3 to the wheel 2. The driving gear 12 includes a helical gear. Furthermore, the driven gear 13 is arranged coaxially with a second rotation shaft 14, and rotates together with the second rotation shaft 14. The driven gear 13 includes a helical gear. The first rotation shaft 8 and the second rotation shaft 14 are arranged in parallel. The second rotation shaft 14 is a rotation shaft that rotates together with the wheel 2, and the rotation shaft functions as an output shaft of the speed reducer 5.

Figure 2:
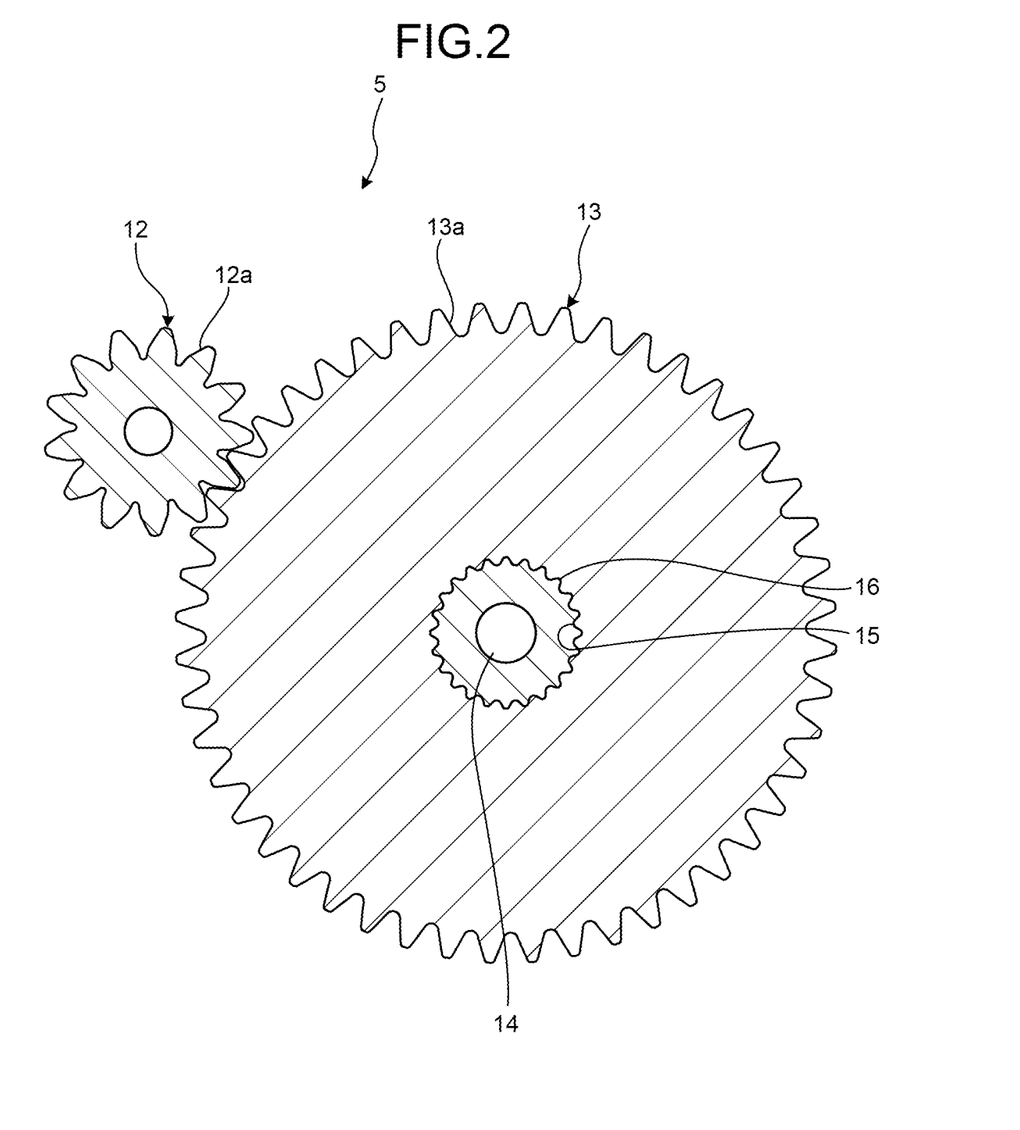
FIG. 2 is a diagram schematically illustrating a driving gear and a driven gear.

As illustrated in FIG. 2, the driving gear 12 is an external gear that has first gear teeth 12a on the outer peripheral portion. The driving gear 12 is a pinion gear integrally molded with the first rotation shaft 8. Furthermore, the driven gear 13 is an external gear that has second gear teeth 13a on the outer peripheral portion. The second gear teeth 13a meshes with the first gear teeth 12a. In other words, the power transmission device 4 has a meshing portion in which the driving gear 12 and the driven gear 13 mesh with each other on the power transmission path between the motor 3 and the wheel 2. In this meshing portion, the driving gear 12 that is a rotation element on the motor side is an input-side rotation member, and the driven gear 13 that is a rotation element on the wheel side is an output-side rotation member.

Furthermore, as illustrated in FIG. 1, the driven gear 13 has a boss portion 13b of cylindrical shape on the inner peripheral side, and the inner peripheral portion thereof is in spline engagement with the second rotation shaft 14.

In the driven gear 13, internal spline teeth 15 are formed on the inner peripheral portion of the boss portion 13b. External spline teeth 16 are formed on the outer peripheral portion of the second rotation shaft 14. A spline engagement portion 17 is formed in which the driven gear 13 is in spline engagement with the second rotation shaft 14. The spline engagement portion 17 is a meshing portion in which meshing teeth mesh with each other on the power transmission path between the motor 3 and the wheel 2, and in the meshing portion, the internal spline teeth 15 and the external spline teeth 16 mesh with each other. In the spline engagement portion 17, the driven gear 13 that is a rotation element on the motor side is an input-side rotation member, and the second rotation shaft 14 that is a rotation element on the wheel side is an output-side rotation member.

Furthermore, the driven gear 13 is rotatably supported to the speed reducer case 7 via a bearing. The second rotation shaft 14 is rotatably supported to the speed reducer case 7 via a hub bearing 18.

The hub bearing 18 has an inner ring, rolling elements, and an outer ring, and the outer ring is fixed to the speed reducer case 7. The inner ring of the hub bearing 18 includes a cylindrical portion of an axle hub 19.

The axle hub 19 is rotatably supported to the speed reducer case 7 via the hub bearing 18. The axle hub 19 is attached to a disc portion 2b of the rim 2a and rotates together with the wheel 2. The axle hub 19 is connected to the outside of the speed reducer case 7 so as to rotate together with the second rotation shaft 14. A brake disc 20 is fixed to the axle hub 19. The axle hub 19 and the brake disc 20 are fixed to the disc portion 2b with a bolt. Therefore, the second rotation shaft 14, the axle hub 19, the brake disc 20, and the rim 2a rotate together.

The brake disc 20 is arranged inside the rim 2a and is configured so that the rotation of the brake disc 20 is stopped by a braking device. This braking device includes a caliper, a brake pad, an actuator and the like that are arranged inside the rim 2a. The braking device is controlled by an electronic control device. When detecting the depression of a brake pedal of the vehicle, the electronic control device activates the actuator of the braking device to press the brake pad against the brake disc 20. Then, the wheel 2 during rotation is stopped by a frictional force generated between the brake pad and the brake disc 20.

During the braking, if the brake pedal is suddenly depressed (during sudden braking) by a driver while the vehicle is running, a large torque is generated as a torque that is reversely input to the power transmission device 4 from the wheel side. The torque generated during this sudden braking is larger than the torque generated upon the motor 3 is locked.

Therefore, the in-wheel motor drive device 1 is configured so that when the vehicle is suddenly braked while the motor 3 is driving the wheel 2, the meshing portion between the driving gear 12 and the driven gear 13 is not broken by the torque generated during the sudden braking. Furthermore, the in-wheel motor drive device 1 is configured so that when the motor 3 is locked while the vehicle is running, the meshing portion between the driving gear 12 and the driven gear 13 is broken by the torque generated upon the locking of the motor 3. In a vehicle to which the in-wheel motor drive device 1 is mounted, left and right drive wheels are configured to be driven independently by the in-wheel motor drive devices 1 provided in the left and right wheels. Therefore, if one of the left and right wheels 2 is locked during running due to trouble in one of the left and right in-wheel motor drive devices 1, running of the vehicle may be affected, causing spin of the vehicle or the like. Therefore, the in-wheel motor drive device 1 is configured to break the meshing portion when the motor 3 is locked to prevent locking of the wheel 2.

Here, the meshing portion between the driving gear 12 and the driven gear 13 will be described in detail with reference to FIGS. 3 to 9.

Figure 3:
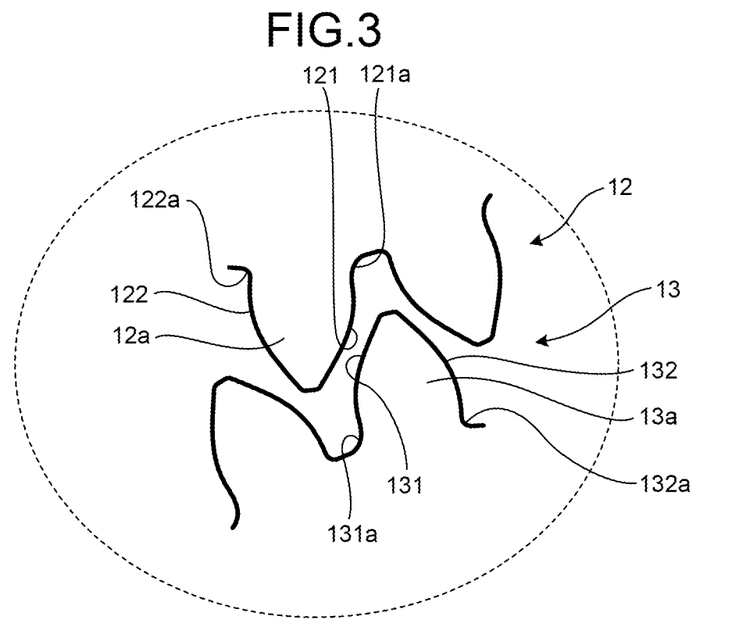
FIG. 3 is a schematic diagram illustrating a meshing portion.

As illustrated in FIG. 3, a first gear tooth 12a of the driving gear 12 has a driving-side teeth surface 121 and a non-driving-side teeth surface 122. A second gear tooth 13a of the driven gear 13 has a driving-side teeth surface 131 and a non-driving-side teeth surface 132. The driving-side teeth surfaces 121 and 131 are teeth surfaces that make contact with each other to transmit power from the motor 3 to the wheel 2. The non-driving-side teeth surfaces 122 and 132 are teeth surfaces that make contact with each other to transmit power from the wheel 2 to the motor 3. Note that FIG. 3 illustrates a state in which the teeth surfaces of the gear teeth are separated for convenience of description.

Figure 4:
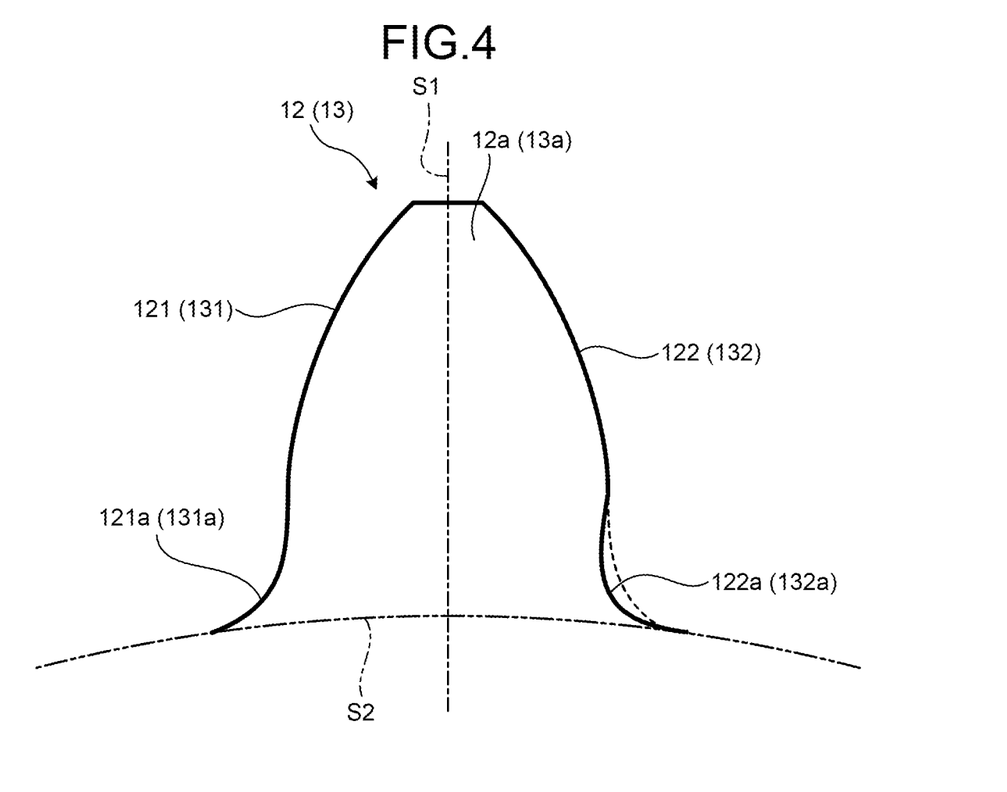
FIG. 4 is a schematic diagram illustrating a teeth surface shape of each of meshing teeth.

As illustrated in FIG. 4, in the first gear tooth 12a, a root shape of the driving-side teeth surface 121 and a root shape of the non-driving-side teeth surface 122 are asymmetric with respect to a meridian line S1 passing through the center of the tip of the first gear tooth 12a, on a plane orthogonal to the first rotation shaft 8. The meridian S1 is a straight line along a radial direction of the driving gear 12. The first gear tooth 12a has portions each of which extends between a pitch point P and a tooth bottom and that are defined as tooth roots 121a and 122a. The tooth roots 121a and 122a each represents a portion on the side of the tooth bottom from the pitch point P. In the first gear tooth 12a, the tooth root 121a of the driving-side teeth surface 121 is formed to have a higher breaking strength than the tooth root 122a of the non-driving-side teeth surface 122. Note that the pitch points P are illustrated in FIGS. 5 to 8. Furthermore, the driving gear 12 is the helical gear, and a tooth trace direction of the first gear tooth 12a is twisted. The tooth trace direction of the first gear tooth 12a represents a twist direction of the first gear tooth 12a. In other words, in some cases, the tooth trace direction of the first gear tooth 12a coincides with a direction along a center line of the tip of the first gear tooth 12a. In this case, it can be expressed that in the first gear tooth 12a, the root shape of the driving-side teeth surface 121 and the root shape of the non-driving-side teeth surface 122 are asymmetric with respect to the meridian S1, on a plane orthogonal to the tooth trace direction.

Specifically, the tooth root 121a of the driving-side teeth surface 121 is formed into a shape that disperses root stress more than the tooth root 122a of the non-driving-side teeth surface 122 in order to secure strength required for driving the wheel 2. In other words, the tooth root 121a is formed into a shape that disperses tensile stress (root stress) acting on the tooth root 121a, when the teeth surface load is applied to the pitch point P of the driving-side teeth surface 121 due to meshing of the gear teeth. For example, the tooth root 121a of the driving-side teeth surface 121 is formed to be inclined with respect to a root circle S2 more gently than the tooth root 122a of the non-driving-side teeth surface 122.

The tooth root 122a of the non-driving-side teeth surface 122 is formed into a shape that concentrates root stress more than the tooth root 121a of the driving-side teeth surface 121 in order to prevent the locking of the wheel 2. In other words, the tooth root 122a is formed into a shape that concentrates tensile stress (root stress) acting on the tooth root 122a, when the teeth surface load is applied to the pitch point P of the non-driving-side teeth surface 122 due to meshing of the gear teeth. For example, the tooth root 122a of the driving-side teeth surface 122 is formed to be inclined with respect to the root circle S2 more steeply than the tooth root 121a of the non-driving-side teeth surface 121.

In FIG. 4, for description of the root shape of the non-driving-side teeth surface 122, a root shape symmetric with respect to the meridian S1 is represented by a broken line. The tooth root 122a is formed into a shape recessed toward the center of a tooth thickness relative to a position indicated by the broken line representing the symmetric shape. For example, the tooth root 122a is formed by cutting out a root portion of the non-driving-side teeth surface 122 from a gear tooth formed symmetrically with respect to the meridian S1. In other words, the tooth root 122a is processed into a shape having a lower breaking strength than the tooth root 121a of the driving-side teeth surface 121.

Furthermore, the second gear tooth 13a is formed in a root shape similar to that of the first gear tooth 12a. In other words, the teeth surface shape and root shapes illustrated in FIG. 4 are applicable to the second gear tooth 13a. In the second gear tooth 13a, a root shape of the driving-side teeth surface 131 is different from a root shape of the non-driving-side teeth surface 132, on a plane orthogonal to the tooth trace direction. The root shape of the driving-side teeth surface 131 and the root shape of the non-driving-side teeth surface 132 are asymmetric with respect to a meridian S1 passing through the center of the tip of the second gear tooth 13a. The second gear tooth 13a has portions each of which extends between a pitch point P and a tooth bottom and that are defined as teeth roots 131a and 132a. The teeth roots 131a and 132a each represents a portion on the side of the teeth bottom from the pitch point P. In the second gear tooth 13a, the tooth root 131a of the driving-side teeth surface 131 is formed to have a higher breaking strength than the tooth root 132a of the non-driving-side teeth surface 132.

Specifically, the tooth root 131a of the driving-side teeth surface 131 is formed into a shape that disperses root stress more than the tooth root 132a of the non-driving-side teeth surface 132 in order to secure strength required for driving the wheel 2. In other words, the tooth root 131a is formed into a shape that disperses tensile stress (root stress) acting on the tooth root 131a, when the teeth surface load is applied to the pitch point P of the driving-side teeth surface 131 due to meshing of the gear teeth. For example, the tooth root 131a of the driving-side teeth surface 131 is formed to be inclined with respect to the root circle S2 more gently than the tooth root 132a of the non-driving-side teeth surface 132.

The tooth root 132a of the non-driving-side teeth surface 132 is formed into a shape that concentrates root stress more than the tooth root 131a of the driving-side teeth surface 131 in order to prevent the locking of the wheel 2. In other words, the tooth root 132a is formed into a shape that concentrates tensile stress (root stress) acting on the tooth root 132a, when the teeth surface load is applied to the pitch point P of the non-driving-side teeth surface 132 due to meshing of the gear teeth. For example, the tooth root 132a of the driving-side teeth surface 132 is formed to be inclined with respect to the root circle S2 more steeply than the tooth root 131a of the non-driving-side teeth surface 131.

Figure 5:
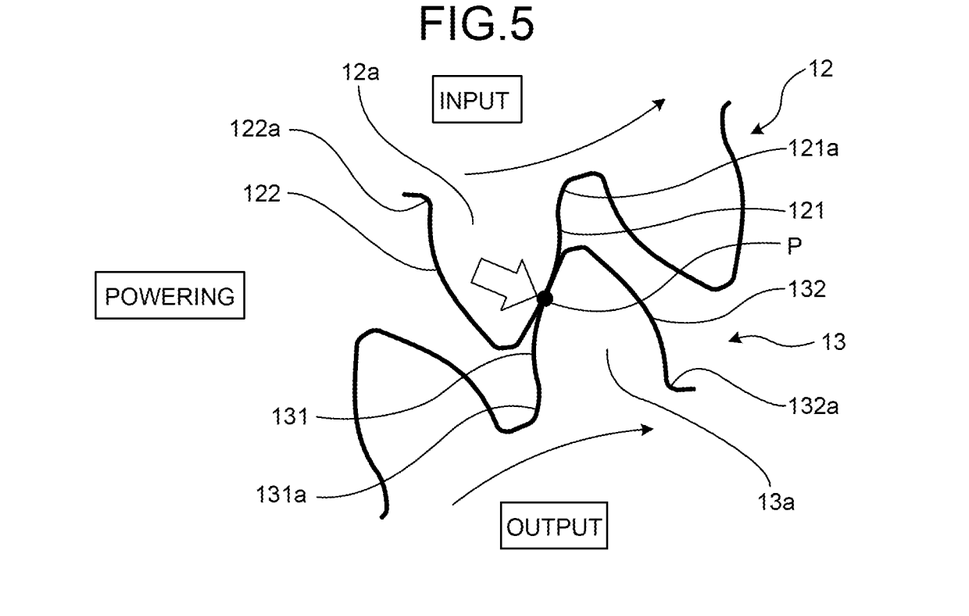
FIG. 5 is a schematic diagram illustrating a contact state of teeth surfaces and a force acting direction, during powering.

As illustrated in FIG. 5, during powering, the motor 3 drives the wheel 2, and thereby the driving-side teeth surface 121 in the first gear tooth 12a of the driving gear 12 makes contact with and presses against the driving-side teeth surface 131 in the second gear tooth 13a of the driven gear 13. Therefore, in transmission of the power of the motor 3 to the wheel 2 during powering, tensile stress acts on the tooth root 121a of the driving-side teeth surface 121 and the tooth root 131a of the driving-side teeth surface 131. Furthermore, during powering, the non-driving-side teeth surface 122 of the first gear tooth 12a and the non-driving-side teeth surface 132 of the second gear tooth 13a do not make contact with each other. Note that the white arrows illustrated in FIGS. 5 to 8 each indicate a direction in which a load is applied.

Figure 6:
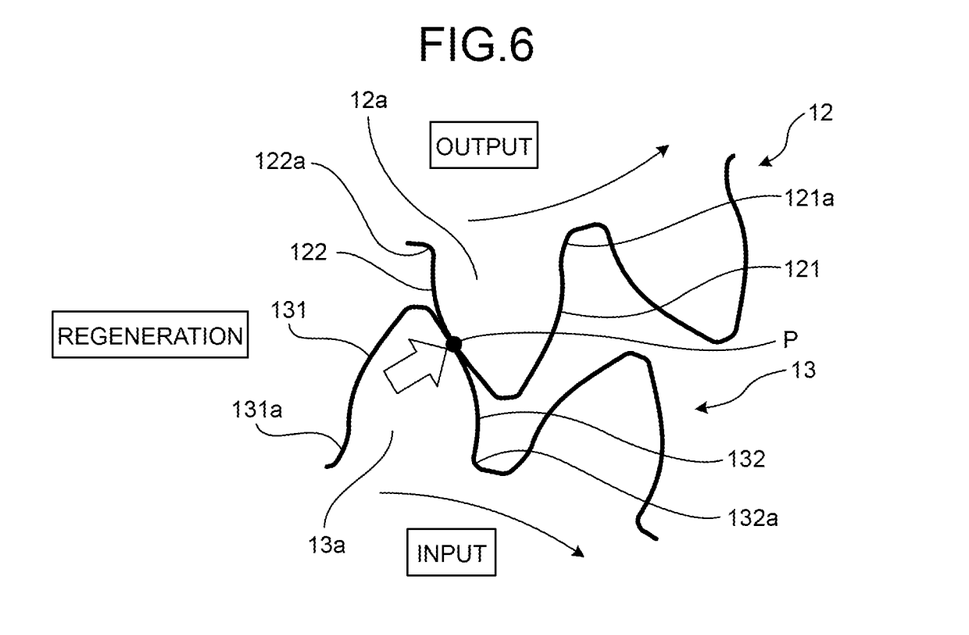
FIG. 6 is a schematic diagram illustrating a contact state of teeth surfaces and a force acting direction, during regeneration.

On the other hand, as illustrated in FIG. 6, during regeneration, the rotor 3a of the motor 3 is rotated by torque reversely input from the wheel 2, and thereby the non-driving-side teeth surface 132 in the second gear tooth 13a of the driven gear 13 makes contact with and presses against the non-driving-side teeth surface 122 in the first gear tooth 12a of the driving gear 12. Therefore, in transmission of power from the wheel 2 to the motor 3 during regeneration, tensile stress acts on the tooth root 122a of the non-driving-side teeth surface 122 and the tooth root 132a of the non-driving-side teeth surface 132. Furthermore, during regeneration, the driving-side teeth surface 131 of the second gear tooth 13a and the driving-side teeth surface 121 of the first gear tooth 12a do not make contact with each other.

Furthermore, upon sudden braking of the vehicle or trouble in rotation of the motor 3 will suddenly stop one of the driving gear 12 and the driven gear 13 of rotating rotation members constituting the power transmission device 4. In other words, sudden braking leads to sudden stopping of the wheel 2 during rotation. An example of this sudden braking includes a "spike stop" that represents stopping the vehicle during running by abruptly and strongly depressing a brake pedal with a pedal effort of approximately 980 N in 0.1 second or less from the start of depressing the brake pedal. Therefore, during sudden braking, an excessive force equivalent to the spike stop acts on the power transmission path of the power transmission device 4. In addition, the trouble in the rotation of the motor 3 represents motor lock that is sudden stopping of the rotation of the rotor 3a caused by foreign matter caught in an air gap (radial gap) between the rotor 3a and the stator 3b while the rotor 3a is rotating.

Figure 7:
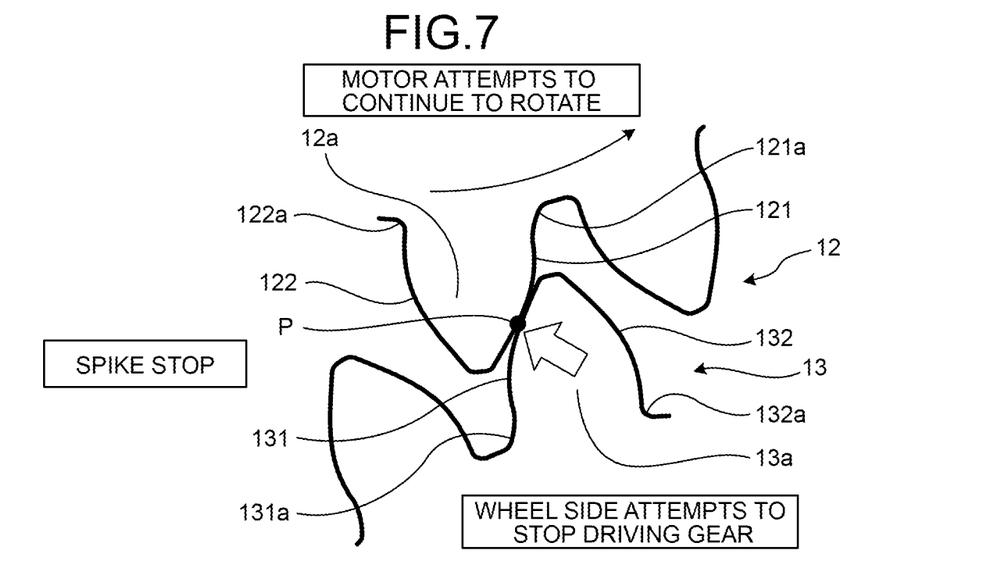
FIG. 7 is a schematic diagram illustrating a contact state of teeth surfaces and a force acting direction, in spike stop.

During the spike stop, the wheel 2 attempts to stop while the motor 3 attempts to continue to rotate, and thus, the driving-side teeth surface 131 in the second gear tooth 13a of the driven gear 13 makes contact with and presses against the driving-side teeth surface 121 in the first gear tooth 12a of the driving gear 12, as illustrated in FIG. 7 in sudden braking of the vehicle during running as in the spike stop, the wheel side attempts to stop the driving gear 12 during rotation, in the meshing portion, and thus, tensile stress acts on the tooth root 121a of the driving-side teeth surface 121 and the tooth root 131a of the driving-side teeth surface 131. Furthermore, during the spike stop, the non-driving-side teeth surface 122 of the first gear tooth 12a and the non-driving-side teeth surface 132 of the second gear tooth 13a do not make contact with each other.

Figure 8:
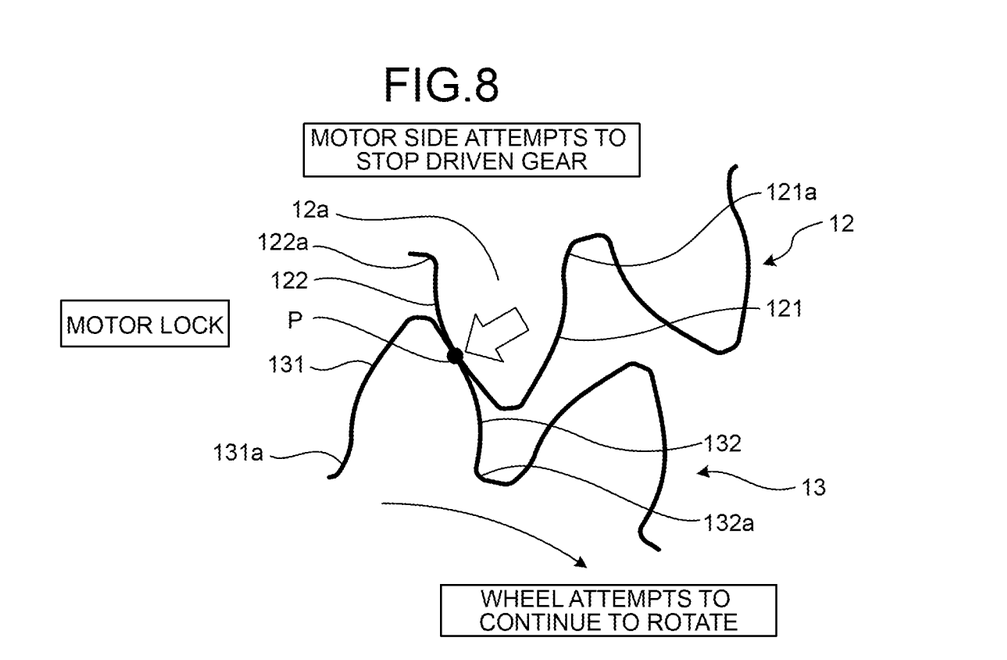
FIG. 8 is a schematic diagram illustrating a contact state of teeth surfaces and a force acting direction, upon motor lock.

Furthermore, during the motor lock, the motor 3 attempts to stop while the wheel 2 attempts to continue to rotate, and thus, the non-driving-side teeth surface 122 in the first gear tooth 12a of the driving gear 12 makes contact with and presses against the non-driving-side teeth surface 132 in the second gear tooth 13a of the driven gear 13, as illustrated in FIG. 8 in locking the rotation of the motor 3 during running of the vehicle, as in the motor lock, the motor side attempts to stop the driven gear 13 that is rotating, in the meshing portion, and thus, tensile stress acts on the tooth root 122a of the non-driving-side teeth surface 122 and the tooth root 132a of the non-driving-side teeth surface 132. Furthermore, during the motor lock, the driving-side teeth surface 121 of the first gear tooth 12a and the driving-side teeth surface 131 of the second gear tooth 13a do not make contact with each other.

As described above, the powering, regeneration, spike stop (sudden braking), and motor lock have different combinations of a force acting direction and the teeth surfaces making contact. Furthermore, the magnitude of the force input to the meshing portion differs depending on the powering, regeneration, spike stop, and motor lock. In other words, the powering, regeneration, spike stop, and motor lock have torques of different magnitudes acting on the power transmission path of the power transmission device 4.

Figure 9:
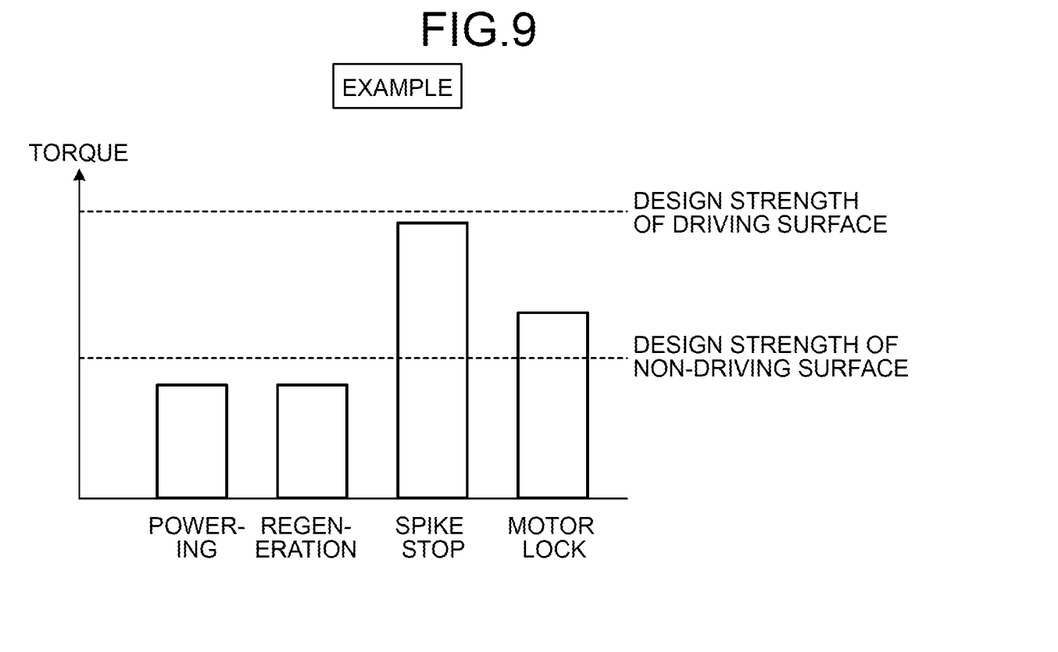
FIG. 9 is a graph illustrating the breaking strength of meshing teeth and magnitude of torque, in an example.

As illustrated in FIG. 9, a torque generated during the powering and a torque generated during the regeneration have similar magnitudes. A torque generated during the motor lock is larger than the torques generated during the powering and regeneration. A torque generated during spike stop is larger than the torque generated during the motor lock. Therefore, a strength of the first gear tooth 12a of the driving gear 12 and a strength of the second gear tooth 13a of the driven gear 13 are each set on the basis of the magnitude of the torque generated in each mode (powering, regeneration, spike stop, or motor lock). Note that FIG. 9 illustrates an example of the torques generated during the powering, regeneration, spike stop, and motor lock, where the vehicle is running at the same predetermined speed, for comparison.

Specifically, the breaking strengths of the driving-side teeth surfaces 121 and 131 are set higher than a predetermined torque generated during the spike stop. This predetermined torque has a fixed value. The torque generated during the spike stop differs in magnitude depending on a running state of the vehicle.

As an example, the breaking strengths of the driving-side teeth surfaces 121 and 131 are set higher than the torque generated upon occurrence of the spike stop due to a sudden brake request given during acceleration running of the vehicle in response to a sudden braking request (increase in amount of depression of accelerator pedal) from the driver. In other words, it is possible to set, as the predetermined torque, the torque generated during the spike stop while the motor 3 is driving under high load. Furthermore, as another example, the breaking strengths of the driving-side teeth surfaces 121 and 131 are set higher than the torque generated upon occurrence of the spike stop due to the sudden braking request given during high-speed running of the vehicle on a highway. In other words, it is also possible to set, as the predetermined torque, the torque generated during the spike stop while the wheel 2 is rotated at high speed. As described above, the breaking strengths of the driving-side teeth surfaces 121 and 131 can be set higher than a maximum torque during the spike stop that can occur in the vehicle in consideration of the weight, running state, or the like of the vehicle. This configuration makes it possible to prevent the meshing portion between the driving gear 12 and the driven gear 13 from breaking during the spike stop.

Furthermore, the breaking strengths of the non-driving-side teeth surfaces 122 and 132 are set lower than a predetermined torque generated during the motor lock. This predetermined torque has a fixed value. The torque generated during the motor lock differs in magnitude depending on the running state of the vehicle.

As an example, the breaking strengths of the non-driving-side teeth surfaces 122 and 132 are set lower than the torque generated upon occurrence of the motor lock during running in which the motor 3 is rotating at high speed. Furthermore, as another example, the breaking strengths of the non-driving-side teeth surfaces 122 and 132 are set lower than the torque generated upon occurrence of the motor lock during running in which the wheel 2 is rotating at high speed. As described above, the breaking strengths of the non-driving-side teeth surfaces 122 and 132 can be set lower than a maximum torque during the motor lock that can occur in the vehicle in consideration of the weight, running state or the like of the vehicle. This configuration makes it possible to break the meshing portion between the driving gear 12 and the driven gear 13 during the motor lock. Therefore, it is possible to prevent the wheel 2 from being locked due to occurrence of the motor lock.

In addition, the breaking strengths of the non-driving-side teeth surfaces 122 and 132 are set higher than a maximum torque generated during powering and a maximum torque generated during the regeneration. The maximum torque generated during the regeneration represents a maximum torque during the regeneration that can be generated in the vehicle in consideration of the weight, running state or the like of the vehicle. In other words, as illustrated in FIG. 9, the breaking strengths of the non-driving-side teeth surfaces 122 and 132 are set higher than the maximum torque generated during the regeneration and set lower than the maximum torque generated during the motor lock.

In this way, in the in-wheel motor drive device 1, the driving-side teeth surfaces 121 and 131 and the non-driving-side teeth surfaces 122 and 132 can be set to have different breaking strengths, and thus, the breaking strengths of the driving-side teeth surfaces 121 and 131 can be set higher than the breaking strengths of the non-driving-side teeth surfaces 122 and 132.

As described above, in the embodiment, the teeth roots 121a and 131a of the driving-side teeth surfaces 121 and 131 that make contact with each other to transmit power from the motor 3 to the wheel 2 are formed to have breaking strengths higher than the teeth roots 122a and 132a of the non-driving-side teeth surfaces 122 and 132 that make contact with each other to transmit power from the wheel 2 to the motor 3. The breaking strengths of the driving-side teeth surfaces 121 and 131 are set higher than the torque generated during the spike stop. Therefore, the driving-side teeth surfaces 121 and 131 are configured to secure strength required for driving the wheel 2. Furthermore, the breaking strengths of the non-driving-side teeth surfaces 122 and 132 are set lower than the torque generated during the motor lock. Therefore, the non-driving-side teeth surfaces 122 and 132 make it possible to prevent the locking of the wheel 2. In a vehicle to which the in-wheel motor drive device 1 is mounted, even if the in-wheel motor drive device 1 that is provided at one of the right and left wheels 2 has a failure, it is possible to prevent the locking of the one wheel 2, and thus, the wheel 2 can be rotated without restriction. This configuration makes it possible to safely stop the vehicle.

Figure 10:
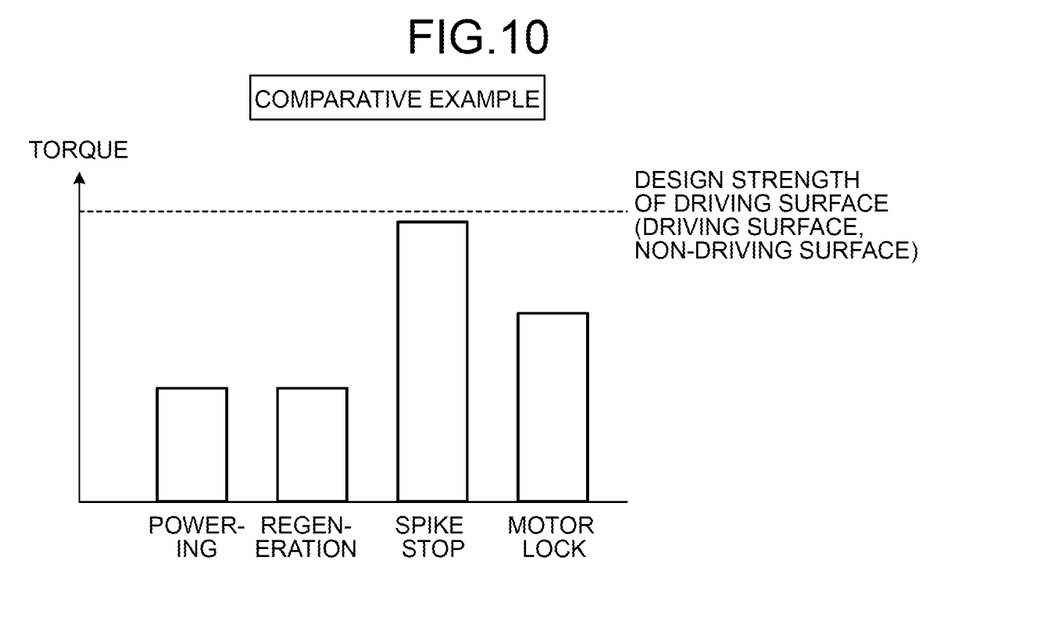
FIG. 10 is a graph illustrating the breaking strength of meshing teeth and magnitude of torque in a comparative example.

In a comparative example illustrated in FIG. 10, the driving-side teeth surfaces and the non-driving-side teeth surfaces are set to have the same breaking strength. In this case, the breaking strengths of the teeth surfaces are set higher than the torque generated during the spike stop in order to withstand the torque generated during the spike stop. In other words, the breaking strengths of the teeth surfaces are higher than the torque generated during the motor lock, and the meshing portion is not broken when the motor lock is generated, but the wheel is locked. On the other hand, in the embodiment, the breaking strengths of the teeth surfaces are set to the breaking strengths as illustrated in FIG. 9, it is possible to prevent locking of the wheel 2 during the motor lock, while ensuring the strength that can withstand the torque generated during the sudden braking. Note that driving teeth surfaces illustrated in FIGS. 9 and 10 represent the driving-side teeth surfaces, and the non-driving surfaces represent the non-driving-side teeth surfaces. Furthermore, design strengths represent the breaking strengths set for the meshing teeth. Furthermore, FIG. 10 illustrates an example of the torques generated during the powering, regeneration, spike stop, and motor lock, where the vehicle is running at the same predetermined speed, for comparison.

Furthermore, as a modification of an embodiment described above, a relationship in breaking strength between a driving-side teeth surface and a non-driving-side teeth surface in a gear tooth is applicable to spline teeth constituting a spline engagement portion. In the in-wheel motor drive device 1, the relationship in breaking strength between a driving-side teeth surface and a non-driving-side teeth surface is applicable to spline teeth forming the spline engagement portion 11 and spline teeth constituting the spline engagement portion 17. In short, a meshing portion formed on the power transmission path of the power transmission device 4 is not particularly limited to a meshing portion where gear teeth mesh with each other or a meshing portion where spline teeth mesh with each other.

Figure 11:
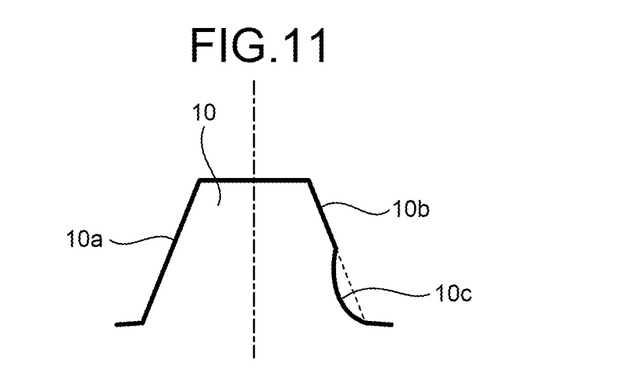
FIG. 11 is a diagram illustrating an example of the shape of a spline teeth in a spline engagement portion.
Figure 12:
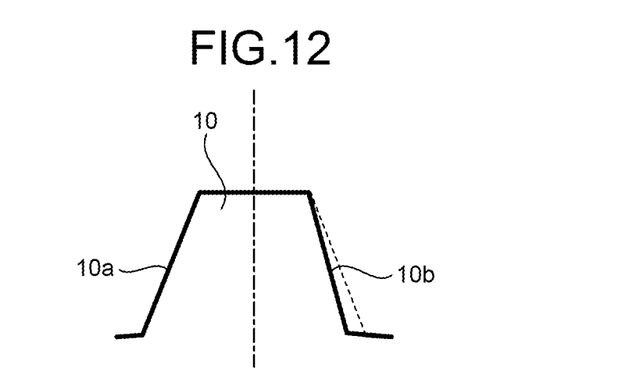
FIG. 12 is a diagram illustrating another example of the shape of a spline teeth in a spline engagement portion.

As illustrated in FIG. 11, an external spline tooth 10 has a driving-side teeth surface 10a and a non-driving-side teeth surface 10b. In this configuration, in the external spline tooth 10, a tooth root of the driving-side teeth surface 10a is formed to have a higher breaking strength than a tooth root 10c of the non-driving-side teeth surface 10b. In FIG. 11, a root shape symmetric with respect to a meridian S1 is represented by a broken line. The tooth root 10c is formed into a shape recessed toward the center of a tooth thickness relative to a position indicated by the broken line representing the symmetric shape. For example, the tooth root 10c is formed by cutting out a root portion of the non-driving-side teeth surface 10b from a spline tooth formed symmetrically with respect to the meridian S1. In other words, the tooth root 10c is processed into a shape having a lower breaking strength than the tooth root of the driving-side teeth surface 10a. Alternatively, as illustrated in FIG. 12, the external spline tooth 10 may be configured so that the driving-side teeth surface 10a is formed into an inclined surface that is inclined shallower than the non-driving-side teeth surface 10b.

Note that although the external spline tooth 10 constituting the spline engagement portion 11 has been described with reference to FIGS. 11 and 12, a relationship between the driving-side teeth surface 10a and the non-driving-side teeth surface 10b is applicable to an internal spline tooth 9. Likewise, the relationship is also applicable to an internal spline tooth 15 and an external spline tooth 16 that constitute the spline engagement portion 17.

Furthermore, as a modification of an embodiment described above, the driving gear 12 and the driven gear 13 may include spur gears. In other words, the meshing portions between the gears may each include a pair of spur gears.

Furthermore, as a modification of an embodiment described above, portions having higher breaking strength of the meshing teeth can be achieved by a configuration other than the shape. For example, it is possible to provide a difference in breaking strength of the meshing teeth, between the driven side and the non-driven side depending on whether heat treatment is applied. In other words, the meshing teeth may be subjected to heat treatment so that the teeth roots 121a and 131a of the driving-side teeth surfaces 121 and 131 have higher breaking strength than the teeth roots 122a and 132a of the non-driving-side teeth surfaces 122 and 132. Specifically, of the meshing teeth, the teeth roots 121a and 131a of the driving-side teeth surfaces 121 and 131 are subjected to heat treatment for increasing the breaking strength, but the teeth roots 122a and 132a of the non-driving-side teeth surfaces 122 and 132 are not subjected to the heat treatment for increasing the breaking strength. Alternatively, of the meshing teeth, the teeth roots 122a and 132a of the non-driving-side teeth surfaces 122 and 132 are subjected to heat treatment for reducing the breaking strength, but the teeth roots 121a and 131a of the driving-side teeth surfaces 121 and 131 are not subjected to heat treatment for reducing the breaking strength. Alternatively, of the meshing teeth, the teeth roots 121a and 131a of the driving-side teeth surfaces 121 and 131 are subjected to heat treatment for increasing the breaking strength, and the teeth roots 122a and 132a of the non-driving-side teeth surfaces 122 and 132 are subjected to heat treatment for reducing the breaking strength. In short, in the meshing teeth, at least one of the teeth surfaces is subjected to heat treatment so that a different value is set to the one teeth surface so as to provide different breaking strength relative to the other teeth surface. As described above, the present disclosure is not limited to the configuration in which there is a difference in shape of each meshing tooth, as described in the above embodiments, and may have a configuration in which a difference is made in breaking strength between the driving side and the non-driving side by application of heat treatment to each meshing tooth.

Furthermore, as a modification of an embodiment described above, the drive device is applicable not only to a vehicle to which an in-wheel motor is mounted but also to a vehicle in which a motor as a power source is mounted to a vehicle body.

As an example, this drive device is applicable to a drive device that is mounted to a hybrid vehicle or electric vehicle. In this case, the spline engagement portion 11 may have a structure in which an outer peripheral portion of the input-side rotation member and an inner peripheral portion of the output-side rotation member have a spline engagement. For example, the power transmission device 4 has the first spline engagement portion in which an outer peripheral portion of an input rotation shaft that rotates together with a rotor of the motor and an inner peripheral portion of the first rotation shaft 8 that rotates together with the driving gear 12 have a spline engagement on the power transmission path. The input rotation shaft has first external spline teeth on the outer peripheral portion. The first rotation shaft 8 has first internal spline teeth that meshes with the first external spline teeth, on the inner peripheral portion. The first external spline teeth and the first internal spline teeth each have a driving-side teeth surface and a non-driving-side teeth surface. In the first external spline teeth and the first internal spline teeth, the tooth root of the driving-side teeth surface is formed to have a higher breaking strength than the tooth root of the non-driving-side teeth surface.

As another example, this drive device is applicable to a drive device that is mounted to a vehicle in which left and right drive wheels can be driven independently by motors. In this case, the drive device is mounted to a vehicle including a first motor that drives a right drive wheel and a second motor that drives a left drive wheel, and the drive device includes a first drive device that transmits the power of the first motor to the right drive wheel, and a second drive device that transmits the power of the second motor to the left drive wheel. In the drive device mounted to a vehicle powered by a pair of motors, which are not limited to the in-wheel motors, that are configured to drive right and left drive wheels independently, the breaking strengths of the meshing teeth as described above are set, and thus, even if a problem occurs in one of the right and left drive devices during running, the vehicle can be prevented from spinning.

In the present disclosure, it is possible to set different breaking strengths between a driving-side teeth surface and a non-driving-side teeth surface in each of meshing teeth provided on a power transmission path between a motor and a wheel. The teeth roots of the driving-side teeth surfaces that make contact with each other to transmit power from the motor to the wheel have a higher breaking strength than the teeth roots of the non-driving-side teeth surfaces that make contact with each other to transmit power from the wheel to the motor. Therefore, the breaking strength at the teeth roots of the driving-side teeth surfaces can be set to a strength required for driving the wheel, and the breaking strength at the teeth roots of the non-driving-side teeth surfaces can be set to a strength required for preventing the lock of the wheel. This configuration makes it possible to prevent locking of the wheel while ensuring the breaking strength required for driving the wheel.

According to an embodiment, it is possible to set different breaking strengths between the driving-side teeth surface and the non-driving-side teeth surface in each of meshing teeth provided on the power transmission path between the motor and the wheel. The teeth roots of the driving-side teeth surfaces that make contact with each other to transmit power from the motor to the wheel have a higher breaking strength than the teeth roots of the non-driving-side teeth surfaces that make contact with each other to transmit power from the wheel to the motor. Therefore, the breaking strength at the teeth roots of the driving-side teeth surfaces can be set to a strength required for driving the wheel, and the breaking strength at the teeth roots of the non-driving-side teeth surfaces can be set to a strength required for preventing the lock of the wheel. This configuration makes it possible to prevent locking of the wheel while ensuring the breaking strength required for driving the wheel.

According to an embodiment, it is possible to set the breaking strength to have different values between the root shape of the driving-side teeth surface and the root shape of the non-driving-side teeth surface by making the root shapes asymmetric with respect to the meridian passing through the center of the tip of the meshing tooth. It is only desired to change the root shape, requiring no addition of other component or the like, and thus, an increase in size can be suppressed.

According to an embodiment, it is possible for the driving-side teeth surface to withstand the torque generated upon sudden braking. Furthermore, rupture of the non-driving-side teeth surface by the torque generated upon sudden stops of the motor makes it possible to prevent the wheel from locking upon locking of the motor.

According to an embodiment, it is possible for the non-driving-side teeth surface to withstand the torque generated upon regeneration.

According to an embodiment, it is possible to set the breaking strength to have different values between the driving-side teeth surface and the non-driving-side teeth surface in a meshing portion between the gear teeth. This configuration prevents locking of the wheel while ensuring the breaking strength required for driving the wheel without adding another component.

According to an embodiment, it is possible to set the breaking strength to have different values between the driving-side teeth surface and the non-driving-side teeth surface, in the first spline engagement portion where the spline teeth mesh with each other, for a vehicle to which the in-wheel motor is mounted.

According to an embodiment, it is possible to set the breaking strength to have different values between the driving-side teeth surface and the non-driving-side teeth surface, in the first spline engagement portion where the spline teeth mesh with each other, for a hybrid vehicle or electric vehicle.

According to an embodiment, it is possible to set the breaking strength to have different values between the driving-side teeth surface and the non-driving-side teeth surface, in the first spline engagement portion where the spline teeth mesh with each other.

According to an embodiment, it is possible to set the breaking strength to have different values between the driving-side teeth surface and the non-driving-side teeth surface, in the spline engagement portion where the spline teeth mesh with each other. This configuration prevents locking of the wheel while ensuring the breaking strength required for driving the wheel without adding another component.

According to an embodiment, it is possible to set the breaking strength to have different values by changing the inclination angle between the driving-side teeth surface and the non-driving-side teeth surface in the spline engagement portion where the spline teeth mesh with each other.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drive device comprising:
a motor; and
a power transmission device that transmits power of the motor to a wheel,
wherein the power transmission device has a meshing portion in which a plurality of meshing teeth that are formed on an input-side rotation member and a plurality of meshing teeth that are formed on an output-side rotation member, the plurality of meshing teeth and the plurality of meshing teeth mesh with each other on a power transmission path between the motor and the wheel,
each of the plurality of meshing teeth of the input-side rotation member has a driving-side teeth surface and a non-driving-side teeth surface, each of the plurality of meshing teeth of the output-side rotation member has a driving-side teeth surface and a non-driving-side teeth surface, the driving-side teeth surface of the input-side rotation member makes contact with the non-driving-side teeth surface of the output-side rotation member when transmitting power from the motor to the wheel, and the non-driving-side teeth surface of the input-side rotation member makes contact with the driving-side teeth surface of the output-side rotation member when transmitting power from the wheel to the motor, and
a tooth root of the driving-side teeth surface of the input-side rotation member has a higher breaking strength than a tooth root of the non-driving-side-teeth surface of the input-side rotation member, and a tooth root of the driving-side teeth surface of the output-side rotation member has a higher breaking strength than a tooth root of the non-driving-side teeth surface of the output-side rotation member, wherein:
the tooth root of the driving-side teeth surface of the input-side rotation member and tooth root of the driving-side teeth surface of the output-side rotation member has a breaking strength that is set higher than a predetermined torque generated when the wheel during rotation is suddenly stopped while the motor is driving the wheel, and
the tooth root of the non-driving-side teeth surface of the input-side rotation member and the tooth root of the non-driving-side teeth surface of the output-side rotation member has a breaking strength that is set lower than a predetermined torque generated when a rotor of the motor during rotation is suddenly stopped while the motor is driving the wheel.

2. The drive device according to claim 1, wherein
the power transmission device includes a rotation shaft that rotates together with the input-side rotation member or the output-side rotation member, and
a root shape of the driving-side teeth surface of the input-side rotation member and a root shape of the non-driving-side-teeth surface of the input-side rotation member are asymmetric with respect to a meridian passing through a center of a tip of a respective meshing tooth, on a plane orthogonal to the rotation shaft.

3. The drive device according to claim 1, wherein
the breaking strength at the tooth root of the non-driving-side teeth surface of the input-side rotation member and the breaking strength at the tooth root of the non-driving-side teeth surface of the output-side rotation member is set higher than a predetermined torque generated during regeneration in which power from the wheel is transmitted to the motor.

4. The drive device according to claim 1, wherein
the input-side rotation member is a first gear,
the output-side rotation member is a second gear that meshes with the first gear
the first gear has one of the plurality of meshing teeth as a first gear tooth, and
the second gear has one of the plurality of meshing teeth as a second gear tooth that meshes with the first gear tooth.

5. The drive device according to claim 4, wherein
the motor is an in-wheel motor provided in a rim of the wheel,
the power transmission device has a first spline engagement portion in which a first rotation member that rotates together with a rotor of the in-wheel motor and a first rotation shaft that rotates together with the first gear have a spline engagement on the power transmission path,
the first rotation member has a first internal spline tooth on an inner peripheral portion thereof,
the first rotation shaft has, on an outer peripheral portion thereof, a first external spline tooth that meshes with the first internal spline tooth,
the first internal spline tooth and the first external spline tooth each have the driving-side teeth surface and the non-driving-side teeth surface, and
in each of the first internal spline tooth and the first external spline tooth, the breaking strength of the tooth root of the driving-side teeth surface is higher than the breaking strength of the tooth root of the non-driving-side teeth surface.

6. The drive device according to claim 4, wherein
the power transmission device has a first spline engagement portion in which a first rotation member that rotates together with a rotor of the motor and a first rotation shaft that rotates together with the first gear have a spline engagement on the power transmission path,
the first rotation member has a first external spline tooth on an outer peripheral portion thereof,
the first rotation shaft has, on an inner peripheral portion thereof, a first internal spline tooth that meshes with the first external spline tooth,
the first external spline tooth and the first internal spline tooth each have the driving-side teeth surface and the non-driving-side-teeth surface, and
in each of the first external spline tooth and the first internal spline tooth, the breaking strength of the tooth root of the driving-side teeth surface is higher than the breaking strength of the tooth root of the non-driving-side-teeth surface.

7. The drive device according to claim 1, wherein
the input-side rotation member has one of the plurality of meshing teeth as an internal spline tooth on an inner peripheral portion thereof,
the output-side rotation member has one of the plurality of meshing teeth as an external spline tooth on an outer peripheral portion thereof, and
the meshing portion is a spline engagement portion in which the input-side rotation member and the output-side rotation member have a spline engagement.

8. The drive device according to claim 7, wherein
in the internal spline tooth and the external spline tooth, the driving-side teeth surface is inclined in a radial direction relative to the non-driving-side-teeth surface.

9. A drive device comprising:
a motor; and
a power transmission device that transmits power of the motor to a wheel,
wherein the power transmission device has a meshing portion in which a plurality of meshing teeth that are formed on an input-side rotation member and a plurality of meshing teeth that are formed on an output-side rotation member, the plurality of meshing teeth and the plurality of meshing teeth mesh with each other on a power transmission path between the motor and the wheel,
each of the plurality of meshing teeth of the input-side rotation member has a driving-side teeth surface and a non-driving-side teeth surface, each of the plurality of meshing teeth of the output-side rotation member has a driving-side teeth surface and a non-driving-side teeth surface, the driving-side teeth surface of the input-side rotation member makes contact with the non-driving-side teeth surface of the output-side rotation member when transmitting power from the motor to the wheel, and the non-driving-side teeth surface of the input-side rotation member makes contact with the driving-side teeth surface of the output-side rotation member when transmitting power from the wheel to the motor, and
a tooth root of the driving-side teeth surface of the input-side rotation member has a higher breaking strength than a tooth root of the non-driving-side-teeth surface of the input-side rotation member, and a tooth root of the driving-side teeth surface of the output-side rotation member has a higher breaking strength than a tooth root of the non-driving-side teeth surface of the output-side rotation member, wherein:
the input-side rotation member is a first gear,
the output-side rotation member is a second gear that meshes with the first gear,
the first gear has one of the plurality of meshing teeth as a first gear tooth,
the second gear has one of the plurality of meshing teeth as a second gear tooth that meshes with the first gear tooth,
the power transmission device has a second spline engagement portion in which a second rotation shaft that rotates together with the wheel and the second gear have a spline engagement on the power transmission path,
the second gear has a second internal spline tooth on an inner peripheral portion thereof,
the second rotation shaft has, on an outer peripheral portion thereof, a second external spline tooth that meshes with the second internal spline tooth,
the second internal spline tooth and the second external spline tooth each have the driving-side teeth surface and the non-driving-side-teeth surface, and
in each of the second internal spline tooth and the second external spline tooth, the breaking strength of the tooth root of the driving-side teeth surface is higher than the breaking strength of the tooth root of the non-driving-side-teeth surface.

\* \* \* \* \*